July 21, 1959
J. G. IMPARATO
2,895,203
YOKE-TYPE CLAMPS
Filed Sept. 17, 1958
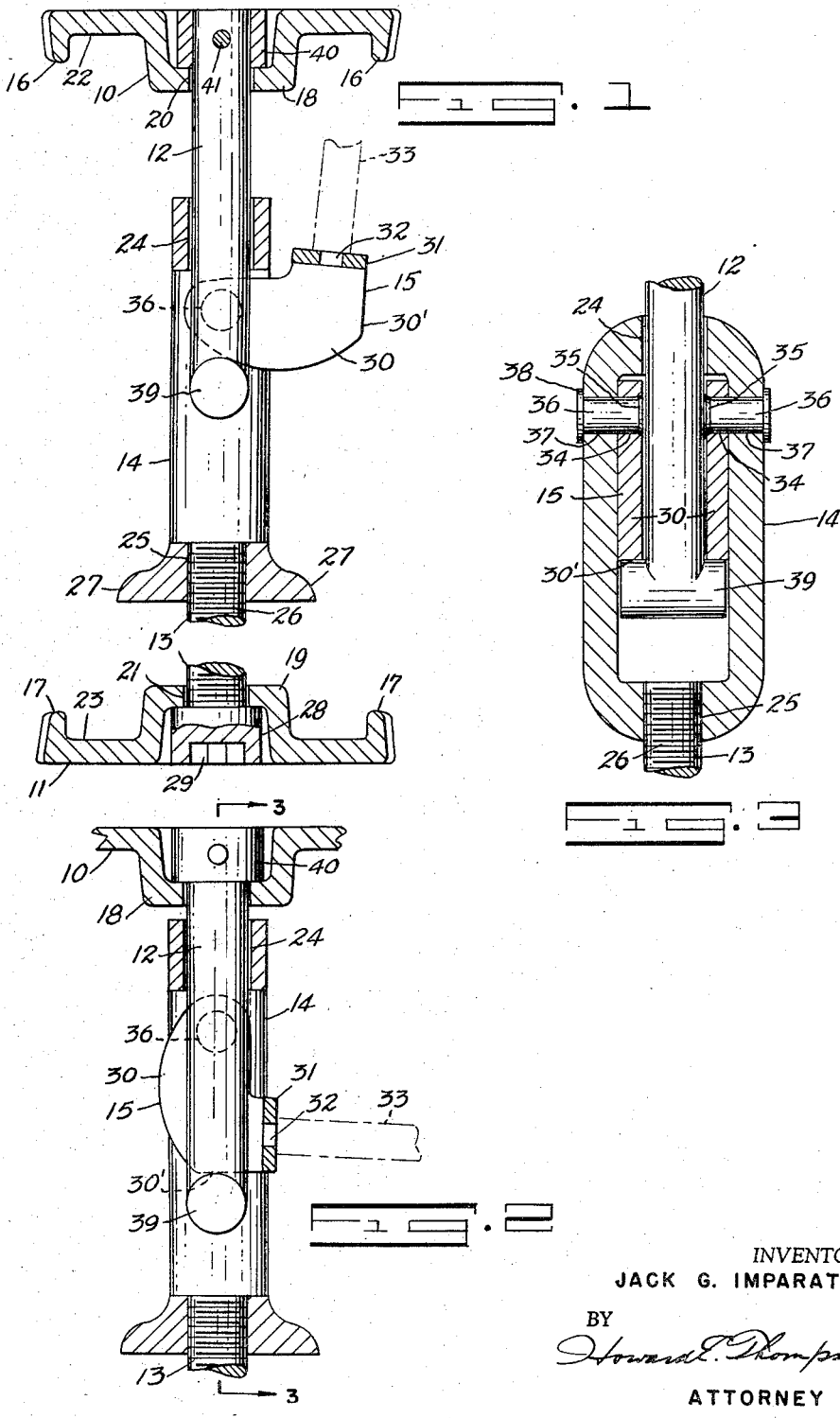
INVENTOR.
JACK G. IMPARATO
BY
Howard L. Thompson
ATTORNEY

United States Patent Office 2,895,203
Patented July 21, 1959

2,895,203

YOKE-TYPE CLAMPS

Jack G. Imparato, Brooklyn, N.Y.

Application September 17, 1958, Serial No. 761,515

8 Claims. (Cl. 24—263)

This invention relates to clamps for use in coupling adjacent articles or products such, for example, as drums. More particularly, the invention deals with a structure of this type and kind, wherein the clamp comprises two clamp plates, a yoke adjustably coupled with one plate, a bolt engaging the second plate and slidably mounted in said yoke and an actuating cam pivotally mounted in connection with the yoke and operatively engaging said bolt in drawing the clamp plates together into operative engagement with said articles or drums.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a longitudinal broken sectional view through a clamp made according to my invention, with the clamp plates illustrated in a non-use position and, further, with the clamp shown in open position.

Fig. 2 is a view, similar to Fig. 1, showing only part of the construction and illustrating the clamp in its closed or operative position; and Fig. 3 is a section on the line 3—3 of Fig. 2, with parts of the construction shown in elevation.

My improved clamp comprises two clamp plates 10 and 11, two rod members or bolts 12 and 13, a yoke 14 and an actuating cam 15.

The plates 10 and 11 are generally of the same contour and comprise curved end flanges 16 on the plate 10 and 17 on the plate 11. The plates 10 and 11 include, centrally thereof, inwardly pressed socket portions 18 and 19, respectively, apertured, as seen at 20 and 21, respectively, to receive the rod members or bolts 12, 13. In order to simplify illustrations, the clamp plates 10 and 11 have been shown in Figs. 1 and 2 of the drawing in a position 90° to the normal position thereof, it being understood that these plates are free to rotate on their supports. In other words, when the plates are in position engaging the articles or drum to be clamped together, the flanges of the plates would be 90° to the showing in these figures.

At this time, it may be well to point out that, in engaging articles such, for example, as the flanged ends of the drums, these ends engage the surfaces 22, 23, respectively, of the plates 10 and 11 inwardly of the flanges 16, 17, the curvatures of the flanges generally conforming to the contour of the drums.

The yoke 14 has apertured ends, as at 24 and 25, the bolt 12 operating in the aperture 24; whereas, the bolt 13 has an elongated thread 26 for adjustable engagement with the aperture 25, which is correspondingly threaded. This end of the yoke also includes flared side bearing portions 27 to be engaged by fork lifts in collectively lifting and handling the drums or other articles coupled together by the clamp.

The free end, or what may be termed the lower end of the bolt 13, includes a head 28, having a hexagon or other socket 29 in its outer surface to facilitate rotation of the bolt 13 in adjusting the position of the yoke 14 therewith in control of spacing between the plates 10 and 11, when in operative position. This adjustment may be sufficient to deal with articles of varying sizes or spacings between upper and lower ends thereof. It will appear that the head 28 is completely contained within the socket 19.

The cam 15 is yoke-shaped in form, in other words, includes ecentric side plates 30 joined by a crosshead 31, apertured, as seen at 32, to receive an actuating tool or rod, the latter being indicated, in part, in dot-dash lines at 33. The rod 33 does not constitute a part of the cam, but is simply a tool moved into engagement with the cam for moving the same from the inoperative position of Fig. 1 to the operative position of Fig. 2.

The eccentric sides 30 terminate in a flat, as at 30'. The side plates 30 of the cam 15 have apertures, as seen at 34 in Fig. 3 of the drawing, to receive flared ends 35 of pivot pins 36, which fit in apertures 37 in opposed sides of the yoke, the outer ends of the pins being headed-over, as seen at 38, to retain the pins against displacement from the yoke.

It will, thus, be apparent that the cam 15 is pivotally mounted in the yoke and the eccentric surfaces of the plates 30 are adapted to operatively engage a T-crosshead 39 at the inner end of the bolt 12 in movement of the cam 15 from the inoperative position of Fig. 1 to the operative position of Fig. 2. In this operation, the bolt 12 moves downwardly in the yoke and, at the same time, the yoke 14 slides upwardly on the bolt 12. In the operative position, the flat surfaces 30' engage the crosshead 39, maintaining the clamp in operative position.

The bolt 12 includes, at its upper end, a collar 40 peened or otherwise secured to the bolt, as indicated at 41, the collar providing a head on the bolt which operates in and is housed within the socket 18, as clearly illustrated in Figs. 1 and 2 of the drawing.

Having fully described my invention, what I claim as new and desire to secure by Letters Patent is:

1. A clamp of the character described, comprising a pair of flanged clamp plates, including central socket portions, the socket portions being apertured to receive rod members, a yoke arranged upon adjacent end portions of said rod members, means, at the other ends of the rod members, for retaining the plates against displacement therefrom, an actuating cam arranged within the yoke and operatively engaging the yoke and one of said rod members in controlling spacing of the clamp plates one with respect to the other, and said cam being pivotally supported on and arranged within the yoke and operatively engaging part of said rod disposed within the yoke.

2. A clamp as defined in claim 1, wherein the cam is yoke-shaped in form, defining cam side plates joined by a crosshead, and the pivotal mounting of the cam in the yoke comprises pivot pins in the yoke and engaging the side plates of the cam.

3. A clamp as defined in claim 2, wherein said part of the rod member includes laterally extending pin portions operatively engaged by the side plates of said cam.

4. A clamp as defined in claim 1, wherein the other of said rod members is adjustable in the yoke in controlling spacing of said plates.

5. A clamp as defined in claim 4, wherein adjustment of the last named rod comprises a threaded end operating in a threaded bore in one end of said yoke, and said rod member having means whereby the same may be rotated in controlling said adjustment.

6. A clamp as defined in claim 5, wherein said end of the yoke includes laterally extending bearing portions.

7. A clamp as defined in claim 1, wherein the means of said first named rod member comprises a head fixed to said end of the rod member.

8. A clamp as defined in claim 1, wherein said part of the rod comprises a T-crosshead operating in said yoke, and said cam including a pair of plates operatively engaging the crosshead.

No references cited.